United States Patent
Hannuksela

(10) Patent No.: US 11,330,271 B2
(45) Date of Patent: May 10, 2022

(54) METHOD AND APPARATUS FOR NON-BINARY PROFILE CONSTRAINT SIGNALING FOR VIDEO CODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/267,174

(22) PCT Filed: Sep. 10, 2019

(86) PCT No.: PCT/FI2019/050651
§ 371 (c)(1),
(2) Date: Feb. 9, 2021

(87) PCT Pub. No.: WO2020/058567
PCT Pub. Date: Mar. 26, 2020

(65) Prior Publication Data
US 2021/0321114 A1      Oct. 14, 2021

Related U.S. Application Data

(60) Provisional application No. 62/732,757, filed on Sep. 18, 2018.

(51) Int. Cl.
*H04N 19/156* (2014.01)
*H04N 19/172* (2014.01)
(Continued)

(52) U.S. Cl.
CPC ......... *H04N 19/156* (2014.11); *H04N 19/172* (2014.11); *H04N 19/184* (2014.11); *H04N 19/46* (2014.11); *H04N 19/70* (2014.11)

(58) Field of Classification Search
CPC combination set(s) only.
See application file for complete search history.

(56) References Cited

U.S. PATENT DOCUMENTS

2014/0006564 A1* 1/2014 Thang ............... H04L 65/602
709/219
2014/0023138 A1   1/2014 Chen
(Continued)

OTHER PUBLICATIONS

Bross et al., "Versatile Video Coding (Draft 2)", Joint Video Experts Team (JVET) of ITU-T SG 16 WP 3 and ISO/IEC JTC 1/SC 29/WG 11, JVET-K1001-v4, Jul. 10-18, 2018, 85 pages.
(Continued)

*Primary Examiner* — Md N Haque
(74) *Attorney, Agent, or Firm* — Joseph C. Drish; Harrington & Smith

(57) ABSTRACT

A method, apparatus and computer program product provide non-binary profile constraints in image or video bitstreams such that a decoder is able to determine whether the decoder can decode the bitstream without completely decoding the bitstream. The method, apparatus and computer program product encode one or more source pictures into a bitstream. The encoding characterized by one or more coding properties (20). The method, apparatus and computer program product further encode a syntax structure indicating the one or more coding properties of the bitstream into or along the bitstream (22). The syntax structure includes a first portion including one or more fixed syntax elements with one or more pre-defined lengths in bits at one or more pre-defined bit positions and a second portion comprising one or more conditional syntax elements. Presence of the conditional syntax element(s) is conditioned based on one or more values associated with the one or more fixed elements.

18 Claims, 4 Drawing Sheets

(51) Int. Cl.
*H04N 19/184* (2014.01)
*H04N 19/46* (2014.01)
*H04N 19/70* (2014.01)

(56) References Cited

U.S. PATENT DOCUMENTS

2014/0086333 A1* 3/2014 Wang ................. H04N 21/8451
  375/240.25
2015/0103886 A1* 4/2015 He ...................... H04N 19/187
  375/240.02
2017/0085897 A1* 3/2017 Narasimhan ....... H04N 21/2353

OTHER PUBLICATIONS

Boyce et al., "Interoperability point signaling for VVC", Joint Video Experts Team (JVET) of ITU-T SG 16 WP 3 and ISO/IEC JTC 1/SC 29/WG 11, JVET-K0311-V1, Jul. 10-18, 2018, pp. 1-4.

"High Efficiency Video Coding", SERIES H: Audiovisual and Multimedia Systems, Infrastructure of audiovisual services—Coding of moving video, Recommendation ITU-T H.265, Feb. 2018, 692 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"3rd Generation Partnership Project; Technical Specification Group Services and System Aspects; Transparent end-to-end and packet switched streaming service (PSS); 3GPP file format (3GP) (Release 15)", 3GPP TS 26.244, V15.0.0, Jun. 2018, pp. 1-67.

"Advanced Video Coding for Generic Audiovisual services", SERIES H: Audiovisual and Multimedia Systems, Infrastructure of audio-visual services—Coding of moving Video, Recommendation ITU-T H.264, Apr. 2017, 812 pages.

International Search Report and Written Opinion received for corresponding Patent Cooperation Treaty Application No. PCT/FI2019/050651, dated Mar. 4, 2020, 18 pages.

"Information technology—Coding of audio-visual objects—Part 15: Carriage of NAL unit structured video in the ISO Base Media File Format", ISO/IEC JTC 1/SC 29/WG 11, ISO/IEC FDIS 14496-15, Apr. 26, 2013, 117 pages.

* cited by examiner

METHOD AND APPARATUS FOR NON-BINARY PROFILE CONSTRAINT SIGNALING FOR VIDEO CODING

RELATED APPLICATION

This application claims priority to PCT Application No. PCT/FI2019/050651, filed on Sep. 10, 2019, which claims priority to U.S. Application No. 62/732,757, filed on Sep. 18, 2018, each of which is incorporated herein by reference in its entirety.

TECHNOLOGICAL FIELD

An example embodiment relates generally to encoding and decoding non-binary profile constraints in videos.

BACKGROUND

In most video codecs, such as High Efficiency Video Coding (HEVC) codec and Versatile Video Coding (VVC) codec, a video is coded in bitstreams that form the representation of coded pictures and associated data forming one or more coded video sequences.

Under the same video codec format, different specific encoders may still encode bitstreams in different ways, for example, different video codecs may encode the bitstream in luma and chroma samples of different width and height, different bit depth, different block size, or the like. Different specific encoders may also encode bitstreams utilizing different settings of access units, predictions, temporal sublayers, chroma format, or the like. Therefore, even if an encoder utilizes a particular video codec (such as VVC) and a decoder utilizes the same video codec (such as VVC), it is possible that the decoder nonetheless do not have the capability of decoding a bitstream encoded by the encoder.

To remedy this problem, some video codecs, such as the VVC, proposed that interoperability points needs to be signalled at profile level that may be used to indicate decoder capabilities needed to decode a bitstream needs to be included in the bitstream. However, there is no functioning standardized mechanism for signalling such interoperability points.

BRIEF SUMMARY

An example embodiment relates generally to encoding and decoding non-binary profile constraints in image or video bitstreams such that a decoder may be able to determine whether the decoder is capable of decoding the bitstream without completely decoding the bitstream.

In one example embodiment, a method is provided that includes encoding one or more source pictures into a bitstream. The encoding characterized by one or more coding properties. The method further includes encoding a syntax structure indicating the one or more coding properties of the bitstream into or along the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements.

In some implementations of such a method, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, an apparatus is provided that includes at least one processor and at least one memory including computer program code for one or more programs with the at least one memory and the computer program code configured to, with the at least one processor, cause the apparatus at least to encode one or more source pictures into a bitstream. The encoding characterized by one or more coding properties. The computer program code is further configured to, with the at least one processor, cause the apparatus to encode a syntax structure indicating the one or more coding properties of the bitstream into or along the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements.

In some implementations of such an apparatus, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, an apparatus is provided that includes means for encoding one or more source pictures into a bitstream. The encoding characterized by one or more coding properties. The apparatus further includes means for encoding a syntax structure indicating the one or more coding properties of the bitstream into or along the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements.

In some implementations of such an apparatus, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, a computer program product is provided that includes at least one non-transitory computer-readable storage medium having computer executable program code instructions stored therein with the computer executable program code instructions comprising program code instructions configured, upon execution, to encode one or more source pictures into a bitstream. The encoding characterized by one or more coding properties. The computer executable program code instructions comprise program code instructions that are further configured, upon execution, to encode a syntax structure indicating the one or more coding properties of the bitstream into or along the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements.

In some implementations of such a computer program product, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, a method is provided that includes receiving a bitstream. The method further includes decoding, using a decoder, one or more coding properties of the bitstream from a syntax structure associated with the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements. The method further includes determining whether the decoder is capable of decoding the bitstream based on the one or more coding properties.

In some implementations of such a method, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, an apparatus is provided that includes at least one processor and at least one memory including computer program code for one or more programs with the at least one memory and the computer program code configured to, with the at least one processor, cause the apparatus at least to receive a bitstream. The computer program code is further configured to, with the at least one processor, cause the apparatus to decode, using a decoder, one or more coding properties of the bitstream from a syntax structure associated with the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements. The computer program code is further configured to, with the at least one processor, cause the apparatus to determine whether the decoder is capable of decoding the bitstream based on the one or more coding properties.

In some implementations of such an apparatus, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, an apparatus is provided that includes means for receiving a bitstream. The apparatus further includes means for decoding, using a decoder, one or more coding properties of the bitstream from a syntax structure associated with the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements. The apparatus further includes means for determining whether the decoder is capable of decoding the bitstream based on the one or more coding properties.

In some implementations of such an apparatus, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

In another example embodiment, a computer program product is provided that includes at least one non-transitory computer-readable storage medium having computer executable program code instructions stored therein with the computer executable program code instructions comprising program code instructions configured, upon execution, to receive a bitstream. The computer executable program code instructions comprise program code instructions that are further configured, upon execution, to decode, using a decoder, one or more coding properties of the bitstream from a syntax structure associated with the bitstream. The syntax structure comprises: a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed elements. The computer executable program code instructions comprise program code instructions that are further configured, upon execution, to determine whether the decoder is capable of decoding the bitstream based on the one or more coding properties.

In some implementations of such a computer program product, the syntax structure is readable by a decoder without decoding one or more pictures from the bitstream. In some embodiments, the first portion includes a profile indicator, and one or more of: one or more constraint flags or one or more extension flags. In some embodiments, the profile indicator indicates a set of algorithmic features or a syntax constraints to which the bitstream conforms, the one or more constraint flags indicates further constraints on one or more algorithmic features or one or more syntax constraints which the bitstream conforms. In some embodiments, the one or more extension flags may affect decoding of the bitstream. In some embodiments, the second portion has a pre-defined length in bits. In some embodiments, the second portion comprises one or more of: a maximum bit depth for one or more luma sample arrays in the bitstream, a maximum bit depth for one or more chroma sample arrays in the bitstream, or one or more other coding property indications associated with the bitstream. In some embodiments, the one or more other coding indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, an indication of an independent non-base layer associated with the bitstream, or the like.

BRIEF DESCRIPTION OF THE DRAWINGS

Figure 1:
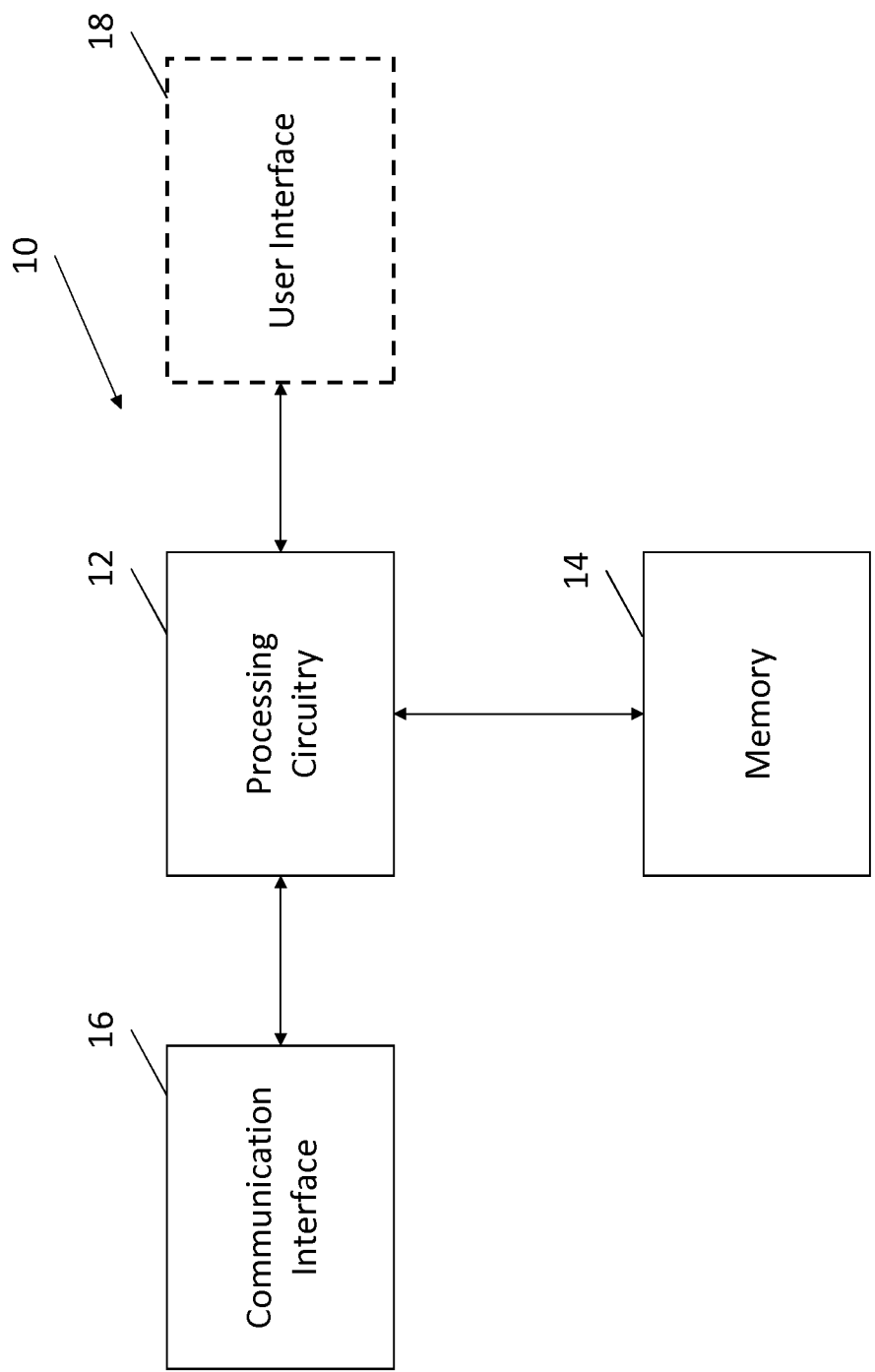
Figure 2:
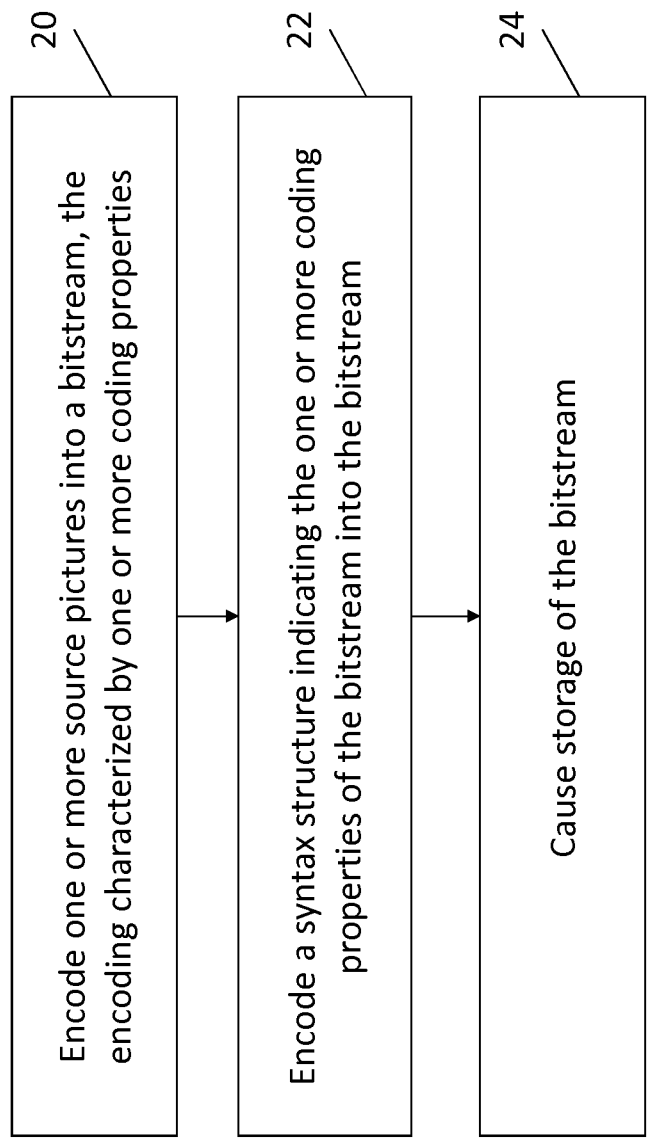
Figures 3A, 3B, 3C:
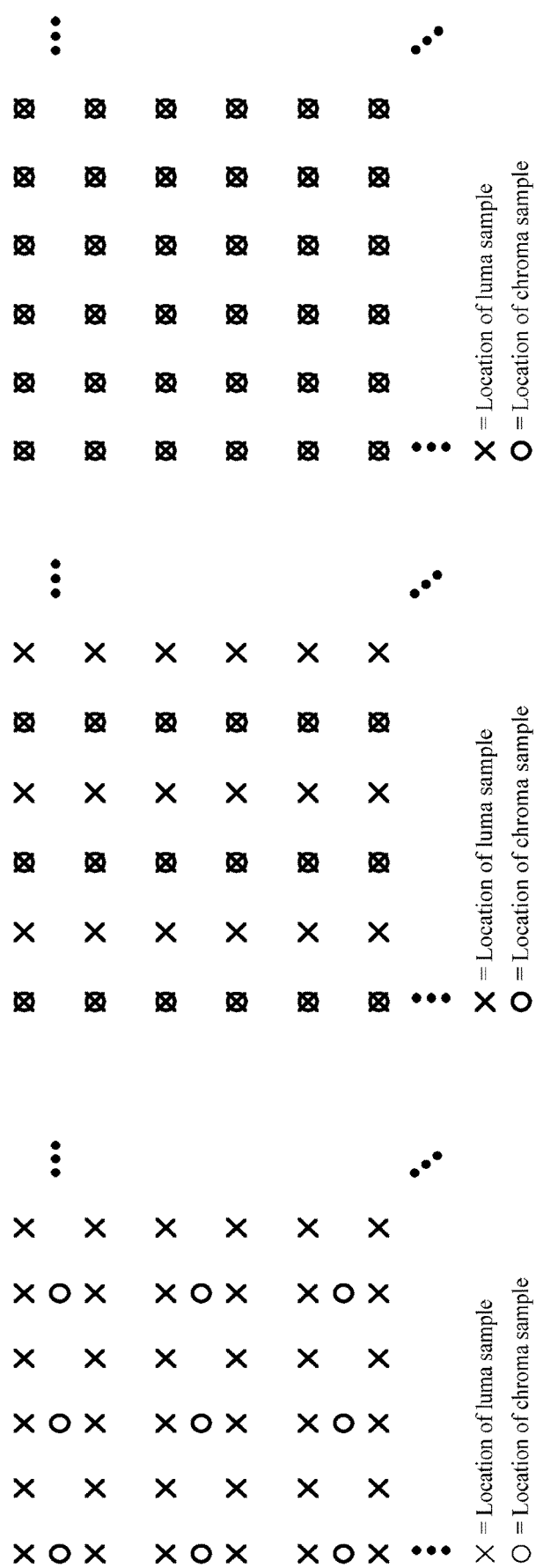

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flowchart illustrating a set of operations performed, such as by the apparatus of FIG. 1, in accordance with an example embodiment of the present disclosure;

FIGS. 3A to 3C show example luma and chroma samples in a picture; and

Figure 4:
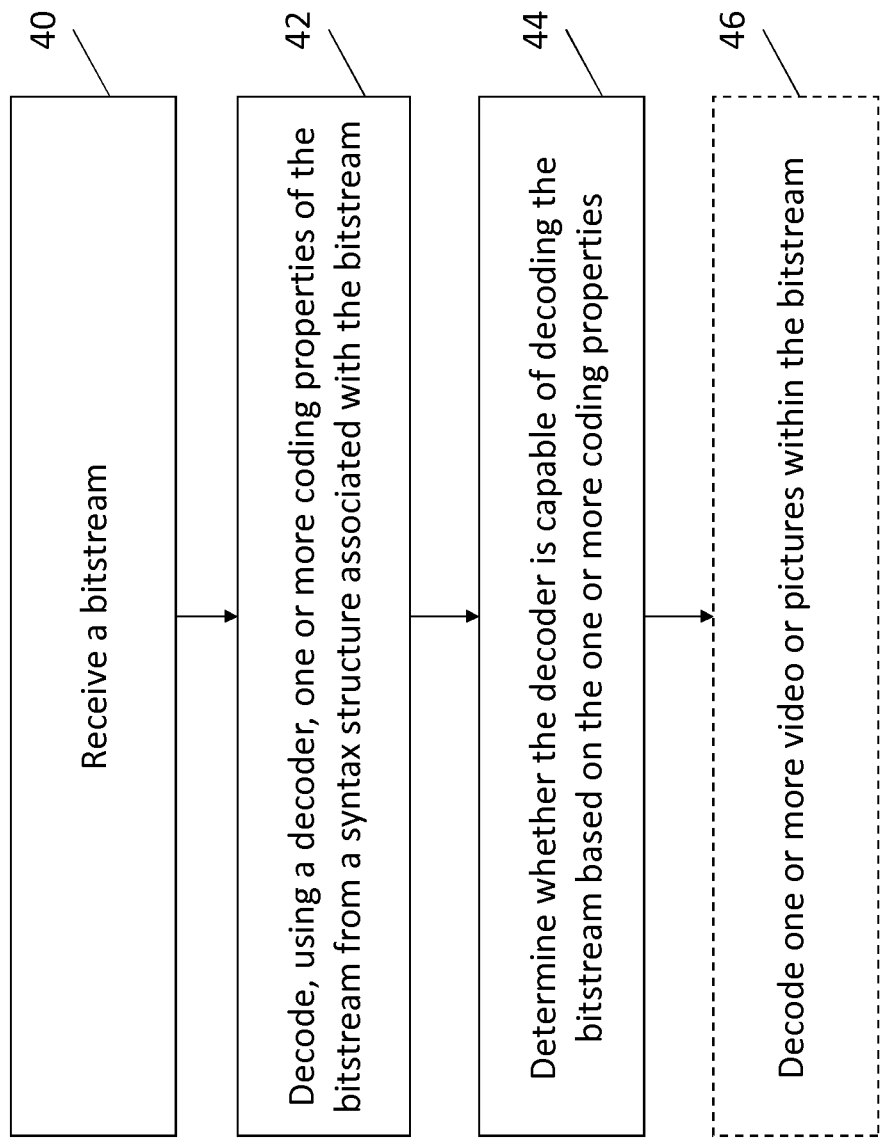

FIG. 4 is a flowchart illustrating a set of operations performed, such as by the apparatus of FIG. 1, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

The standardization of the Versatile Video Coding (VVC, H.266, or H.266/VVC) standard has been started in the Joint Video Experts Team (JVET) of ITU-T and MPEG. The development of VVC version 1 is expected to last until late 2020. When VVC is discussed below, it needs to be understood that a draft VVC standard is referred to, and some aspects of the final VVC standard may differ from what has been described below.

In most video codecs, such as High Efficiency Video Coding (HEVC) codec and Versatile Video Coding (VVC) codec, a video is coded in bitstreams that form the representation of coded pictures and associated data forming one or more coded video sequences.

Under the same video codec format, different specific encoders may still encode bitstreams in different ways, for example, different video codecs may encode the bitstream in luma and chroma samples of different width and height, different bit depth, different block size, or the like. Different specific encoders may also encode bitstreams utilizing different settings of access units, predictions, temporal sub-layers, chroma format, or the like. Therefore, even if an encoder utilizes a particular video codec (such as VVC) and a decoder utilizes the same video codec (such as VVC), it is possible that the decoder nonetheless do not have the capability of decoding a bitstream encoded by the encoder.

To remedy this problem, some video codecs, such as the VVC, proposed that interoperability points needs to be signalled at profile level (in the form of profile constraints) that may be used to indicate decoder capabilities needed to decode a bitstream needs to be included in the bitstream. However, there is no functioning standardized mechanism for signalling such interoperability points.

A method, apparatus and computer program product are provided in accordance with an example embodiment to enable encoding and decoding non-binary profile constraints in image or video bitstreams such that a decoder may be able to determine whether the decoder is capable of decoding the bitstream without completely decoding the bitstream. An example embodiment of the method, apparatus and computer program product enables signaling of bitstream interoperability points defined by third parties, which may be required subsets of the profiles and levels of a coding standard such as VVC. An example embodiment of the method, apparatus and computer program product also enables non-binary parameters in interoperability point signaling which allows greater flexibility in interoperability point definitions. An example embodiment of the method, apparatus and computer program product utilizes a fixed pre-defined number of bits/bytes for interoperability point signaling for the purpose of: 1) Easier management in communication protocols because no length field or other framing needed for the signaling; 2) Easier implementations on the decoder and encoder because no variable-length memory allocation needed. An example embodiment of the method, apparatus and computer program product enables forward compatibility of the interoperability point signaling which allows a decoder/encoder to process inputs from a later version of itself. In addition, certain example embodiments of the method, apparatus and computer program product also enable backward compatibility of the interoperability point signaling. All of the above mentioned features contribute to saving computing resources, such as processing power, non-persistent memory storage space, persistent storage space, communication protocol bandwidth, or the like.

The method, apparatus and computer program product may be utilized in conjunction with a variety of video formats including the High Efficiency Video Coding standard (HEVC or H.265/HEVC) or the upcoming Versatile Video Coding standard (VVC, H.266, or H.266/VVC). An example embodiment is described in conjunction with the HEVC and VVC, however, the present disclosure is not limited to HEVC or VVC, but rather the description is given for possible basis on top of which an example embodiment of the present disclosure may be partly or fully realized. Particularly, the disclosure may be partly or fully realized with the draft H.266 standard.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and 3$^{rd}$ Generation Partnership Project (3GPP file format) (3GPP Technical Specification 26.244, also known as the 3GP format).

When describing certain example embodiments related to HEVC and VVC, common notation for arithmetic operators, logical operators, relation operators, bit-wise operators, assignment operators, and range notation e.g. as specified in HEVC may be used. Furthermore, common mathematical functions e.g. as specified in HEVC may be used and a common order or precedence and execution order (from left to right or from right to left) of operators e.g. a specified in HEVC may be used.

When describing certain example embodiments related to HEVC and VVC, the following description may be used to specify the parsing process of each syntax element.

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded syntax element with the left bit first.

An Exponential-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

When describing certain example embodiments related to HEVC and VVC, only the relevant parts of syntax structures may be included in the description of the syntax and semantics. Three dots (' . . . ') may be used to indicate that other syntax elements may be included in the syntax structure. It needs to be understood that other embodiments could be realized similarly with a different order and names of syntax elements.

When describing certain example embodiments related to HEVC and VVC, syntax structures, semantics of syntax elements, and decoding process may be specified as follows. Each syntax elements is described by its name (all lower case letters with underscore characteristics), optionally its one or two syntax categories, and one or two descriptors for its method of coded representation. The decoding process behaves according to the value of the syntax element and to the values of previously decoded syntax elements. When a value of a syntax element is used in the syntax tables or the text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing an example embodiment, the term file is sometimes used as a synonym of syntax structure or an instance of a syntax structure. For example, a phrase parameter set file may be used to mean a parameter set syntax structure or an instance of a parameter set (with particular values of its syntax elements). In other contexts, the term file may be used to mean a computer file, i.e. a resource forming a standalone unit in storage.

When describing an example embodiment, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Regardless of the file format of the video bitstream, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

An elementary unit for the input to a video encoder and the output of a video decoder is typically a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC. A component may be defined as an array or single sample from one of the three sample arrays (luma and two chroma) or the array or a single sample of the array that compose a picture in monochrome format.

A picture may be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

It may be possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of an embodiment related to HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

An elementary unit for the output of an HEVC encoder and the input of an HEVC decoder, respectively, is a Network Abstraction Layer (NAL) unit. For transport over packet-oriented networks or storage into structured files, NAL units may be encapsulated into packets or similar structures. A bytestream format has been specified in HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In HEVC, the NAL unit header indicates the type of the NAL unit.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and certain described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

In an example embodiment, a video file includes an elementary stream which is a sequence of one or more bitstreams. A bitstream forms the representation of coded pictures and associated data forming one or more coded video sequences (CVSs). A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC, the EOB NAL unit is required to have nuh_layer_id equal to 2.

In an example embodiment related to HEVC, a coded video sequence group (CVSG) may be defined as one or more consecutive coded video sequences in decoding order for which the same video parameter set is active. It may be considered that all the multi-and cross-layer properties remain unchanged within a CVSG. More generally, a CVSG or a similar concept could be specified to be the sequence of access units in which the same sequence parameters (e.g. the same sequence parameter set) apply.

A coded video sequence (CVS) may be defined by a sequence of access units that consists, in decoding order, of a "closed-Group of Pictures (GOP)" intra random access point (IRAP) access unit followed by zero or more access units that are not closed-GOP IRAP access units. A closed-GOP IRAP access unit may be defined to be such that either is not followed by pictures referencing pictures preceding the IRAP access unit in decoding order or causing the decoding process to skip pictures referencing pictures preceding the IRAP access unit in decoding order. Another way to define a coded video sequence is that it is such a sequence of coded pictures in decoding order that is independently decodable and is followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Many video coding standards specify the bitstream syntax and semantics as well as the decoding process for error-free bitstreams. The encoding process is not specified in many standards, but encoders must generate conforming bitstreams. Many standards enable verifying bitstream and decoder conformance with the Hypothetical Reference Decoder (HRD). The standards may contain coding tools that help in coping with transmission errors and losses, but the use of the tools in encoding may be optional and no decoding process for erroneous bitstreams might have been specified.

Video coding standards use variable-bitrate coding, which is caused for example by the flexibility of the encoder to select adaptively between intra and inter coding techniques for compressing video frames. To handle fluctuation in the bitrate variation of the compressed video, buffering may be used at the encoder and decoder side. Hypothetical Reference Decoder (HRD) may be regarded as a hypothetical decoder model that specifies constraints on the variability within conforming bitstreams, conforming NAL unit streams or conforming byte streams that an encoding process may produce.

In many video coding standards, a compliant bitstream must be able to be decoded by a hypothetical reference decoder that may be conceptually connected to the output of an encoder and consists of at least a pre-decoder buffer, a decoder and an output/display unit. This virtual decoder is known as the hypothetical reference decoder (HRD) in e.g. H.265/HEVC, and the video buffering verifier (VBV) e.g. in MPEG-4 Part 2. The virtual decoder and buffering verifier are collectively called as hypothetical reference decoder (HRD) in this document. A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

An HRD may be a part of an encoder or operationally connected to the output of the encoder. The buffering occupancy and possibly other information of the HRD may be used to control the encoding process. For example, if a coded data buffer in the HRD is about to overflow, the encoding bitrate may be reduced for example by increasing a quantizer step size.

The operation of the HRD may be controlled by HRD parameters, such as buffer size(s) and initial delay(s). The HRD parameter values may be created as part of the HRD process included or operationally connected to encoding. Alternatively, HRD parameters may be generated separately from encoding, for example in an HRD verifier that processes the input bitstream with the specified HRD process and generates such HRD parameter values according to which the bitstream in conforming. Another use for an HRD verifier is to verify that a given bitstream and given HRD parameters actually result into a conforming HRD operation and output.

The HRD may contain a coded picture buffer (CPB), an instantaneous decoding process, a decoded picture buffer (DPB), and output cropping.

HRD models typically include instantaneous decoding, while the input bitrate to the coded picture buffer (CPB) of HRD may be regarded as a constraint for the encoder and the bitstream on decoding rate of coded data and a requirement for decoders for the processing rate. The CPB operates in a serial fashion, i.e. decodes data units, such as coded pictures or H.265/HEVC decoding units, in their decoding or bitstream order.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8bits, zero_byte, start_code_prefix_one_3bytes, and trailing_zero_8bits that form a byte stream from the NAL unit stream.

Two types of HRD parameters (NAL HRD parameters and VCL HRD parameters) may be used. The HRD parameters may be indicated through video usability information included in the sequence parameter set syntax structure. The HRD parameters may, for example, include buffer size and input bitrate.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Coding standards may specify "profiles" and "levels." A profile may be defined as a subset of algorithmic features of the standard (of the encoding algorithm or the equivalent decoding algorithm). In another definition, a profile is a specified subset of the syntax of the standard (and hence implies that the encoder may only use features that result into a bitstream conforming to that specified subset and the decoder may only support features that are enabled by that specified subset).

A level may be defined as a set of limits to the coding parameters that impose a set of constraints in decoder resource consumption. In another definition, a level is a defined set of constraints on the values that may be taken by the syntax elements and variables of the standard. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

An indicated profile and level can be used to signal properties of a media stream and/or to signal the capability of a media decoder.

In HEVC, a tier is defined as A specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

A profile_tier_level( ) syntax structure which may be used to indicate decoder capability required for a bitstream in HEVC comprises the following syntax elements:

general_profile_space, which is required to be equal to 0
general_tier_flag. A tier is defined as A specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it. The tier with general_tier_flag equal to 0 is considered to be a lower tier than the tier with general_tier_flag equal to 1.
general_profile_idc is a profile identifier, indicating a profile that the CVS conforms to.
profile compatibility flags (general_profile_compatibility_flag[j], with j in the range of 0 to 31, inclusive). When a profile compatibility flag having index j is equal to 1, it indicates that the CVS conforms to the profile indicated by general_profile_idc equal to j. Profile compatibility flags enable indicating that a CVS conforms to more than one profile.
constraint flags indicate further constraints beyond those imposed by the general_profile_idc.
general_level_idc indicate a level that the CVS conforms to.
optionally, selected pieces of the above information for sub-bitstreams consisting of a subset of temporal sub-layers In HEVC, the profile_tier_level( ) syntax structure may be carried in the following structures:

Video parameter set (its "base" part), indicating the profile-tier-level conformance for the entire bitstream, including all layers, when only the base layer is decoded and output
Sequence parameter set (SPS) (in the base layer or activated for independent layers), indicating the profile-tier-level conformance for the independent layers for which the SPS is active
Extension part of the video parameter set (vps_extension( )), indicating the profile-tier-level conformance of the base layer when it has been extracted into its own sub-bitstream (i.e. excluding all other layers).
A list of profile_tier_level syntax structures in the extension part of the video parameter set. For each layer in each output layer set, the profile-tier-level conformance may be indicated through an index to the list.

In the above mentioned HEVC profile_tier_level syntax structure, only binary indications, for example, flags, are included in the profile-level signaling that has a fixed pre-defined length in bits. Therefore, the indications included in such a profile_tier_level syntax is highly limited.

Referring now to FIG. 2, the operations performed, such as by the apparatus 10 of FIG. 1, in order to encode a syntax structure that include non-binary profile constraints in image or video bitstreams such that a decoder may be able to determine whether the decoder is capable of decoding the bitstream without completely decoding the bitstream, is illustrated.

As shown in block 20, the apparatus includes means, such as the processing circuitry 12, the communication interface 16 or the like, for encoding one or more source pictures into a bitstream, the encoding characterized by one or more coding properties. The bitstream may be a video or a image bitstream and the bitstream may be received as part of other bitstreams, such as other bitstreams in the same elementary stream and bitstreams from other elementary streams. In some embodiments, the bitstream may be a bitstream defined under VVC or a bitstream defined under HEVC. In some embodiments, the one or more source pictures may be received by the apparatus via the processing circuitry, the communication interface 16, or the like.

As shown in block 22, the apparatus includes means, such as the processing circuitry 12, the memory 14 or the like, for encoding a syntax structure indicating one or more coding properties of the bitstream into or along the bitstream.

In some embodiments, the syntax structure include a first portion comprising one or more fixed syntax elements with one or more pre-defined lengths in bits at one or more pre-defined bit positions, and a second portion comprising one or more conditional syntax elements. In some embodiment, presence of the one or more conditional syntax elements is conditioned based on one or more values associated with the one or more fixed elements. In some embodiments, each of the one or more conditional syntax elements has one or more pre-defined lengths in bits. In some embodiments, the second portion has a pre-defined length in bits.

An example syntax structure including the first portion and the second portion is illustrated in the table below:

```
profile_level( ) {                                  Descriptor
    profile_idc                                     u(8)    ⎫
    level_idc                                       u(8)    ⎪
    default_chroma_format_flag                      u(1)    ⎪
    default_bit_depth_flag                          u(1)    ⎬  first portion
    sps_cclm_enabled_flag                           u(1)    ⎪
    sps_mts_intra_enabled_flag                      u(1)    ⎪
    sps_mts_inter_enabled_flag                      u(1)    ⎭
    reserved_one_59bits                             u(59)
    startBitPos = bitstream_pointer_pos( )
    if( default_chroma_format_flag == 0 ) {
        chroma_format_idc                           ue(v)
        if( chroma_format_idc == 3 )
            separate_colour_plane_flag              u(1)
    }
    if( default_bit_depth_flag == 0 ) {                     ⎫  second portion
        bit_depth_luma_minus8                       ue(v)   ⎬
        bit_depth_chroma_minus8                     ue(v)   ⎪
    }                                                       ⎪
    endBitPos = bitstream_pointer_pos( )                    ⎪
    numStuffingBits = 176– (endBitPos – startBitPos)        ⎪
    for( i = 0; 1 < minStuftingBits; i++ )                  ⎪
        reserved_one_bit                            u(1)    ⎭
}
```

It needs to be understood that even though a profile indicator (profile_idc) and a level indicator (level_idc) are included in the example syntax above and in certain example embodiments, the embodiments could similarly be realized without such indicators. For example, a profile indicator and/or a level indicator could be included in another syntax structure, or one or both them could be omitted completely by the information in or along the bitstream, e.g. in the first portion and/or the second portion.

In the illustrated example, the profile_level( ) syntax structure is encoded in the bitstream in one or more of the following syntax structures:
  Sequence parameter set (preferably prior to any variable-length coded syntax elements).
  Video parameter set (preferably prior to any variable-length coded syntax elements).
  CVSG parameter set or bitstream parameter set, which are like sequence parameter set but specified for a CVSG or a bitstream, respectively.
  Header for bitstream, CVSG, or CVS, where the header may be conditionally included in a coded video NAL unit.
  Raw Byte Sequence Payload (RBSP) (and respective NAL unit) for containing a header for bitstream, CVSG, or CVS. In the decoding process, the RBSP may be activated at the position where it appears in the bitstream.
  Any option as above where only the profile_level( ) syntax structure is included without any other syntax elements or syntax structures.

In the example illustrated, the first portion comprises a profile indicator (profile_idc), a level indicator (level_idc), and 64 constraint flags. The second portion comprises 176 bits. The number of the constraint flags and the length of the syntax elements are merely examples; other pre-defined lengths could likewise be used.

In some embodiments, the syntax structure, such as the profile_level( ) syntax structure, may be carried in a media description (for example, Multipurpose Internet Mail Extension (MIME) parameter, session description protocol (SDP) or dynamic adaptive streaming over HTTP (Hypertext Transfer Protocol) Media Presentation Description (DASH MPD)) and/or by a communication protocol.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

In an embodiment, the pre-defined bit count of the first portion and/or the second portion and/or certain pre-defined parts of the first portion and/or the second portion is selected to be suitable for the carriage mechanism or communication protocol. For example, a byte alignment could be selected for efficient memory allocation. In an another example embodiment, the number of bits in the proposed profile_level( ) syntax, e.g. for all syntax elements after the profile and level indicators, is divisible by both 6 and 8 (i.e. integer multiple of 24 bits), thus enabling base64 encoding e.g. as part of the codecs MIME parameter. The base64 encoding represents binary data in an American Standard Code for Information Exchange (ASCII) string in a manner that each base64 "digit" (character) represents 6 bits of binary data.

In the example profile_level( ) syntax structure illustrated, default_chroma_format_flag equal to 1 specifies that the variable ChromaFormatIdc is set equal to 1. The semantics of ChromaFormatIdc are specified identically to those for chroma_format_idc as described earlier, default_chroma_format_flag equal to 0 specifies that pl_chroma_format_idc is present.

default_bit_depth_flag equal to 1 specifies that bit_depth_luma_minus8 and bit_depth_chroma_minus8 are inferred to be equal to 0. default_bit_depth_flag specifies that bit_depth_luma_minus8 and bit_depth_chroma_minus8 are present in the bitstream, such as in a sequence parameter set included in the bitstream.

One example sequence parameter set is provided in the table below:

| seq_parameter_set_rbsp( ) { | Descriptor |
|---|---|
| sps_seq_parameter_set_id | ue(v) |
| chroma_format_idc | ue(v) |
| if( chroma_format_idc = = 3 ) | |
|    separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_infra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) | |
| } | | sps_seq_parameter_set_id provides an identifier for the SPS for reference by other syntax elements. The value of sps_seq_parameter_set_id may be in the range of 0 to 15, inclusive.

chroma_format_idc specifies the chroma sampling relative to the luma sampling as specified below. The value of chroma_format_idc may be in the range of 0 to 3, inclusive.

separate_colour_plane_flag equal to 1 specifies that the three colour components of a 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

There is no dependency in decoding processes between the colour planes having different colour_plane_id values. For example, the decoding process of a monochrome picture with one value of colour_plane_id does not use any data from monochrome pictures having different values of colour_plane_id for inter prediction.

The variables SubWidthC and SubHeightC are specified in the following table, depending on the chroma format sampling structure, which is specified through chroma_format_idc and separate_colour_plane_flag.

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:
  If separate_colour_plane_flag is equal to 0, each of the two chroma arrays has the same height and width as the luma array.
  Otherwise (separate_colour_plane_flag is equal to 1), the three colour planes are separately processed as monochrome sampled pictures.

The number of bits necessary for the representation of each of the samples in the luma and chroma arrays in a video sequence is in the range of 8 to 16, inclusive, and the number of bits used in the luma array may differ from the number of bits used in the chroma arrays.

When the value of chroma_format_idc is equal to 1, the nominal vertical and horizontal relative locations of luma and chroma samples in pictures are shown below. Alternative chroma sample relative locations may be indicated in video usability information.

When the value of chroma_format_idc is equal to 1, the nominal vertical and horizontal relative locations of luma and chroma samples in pictures are shown in the example in FIG. 3A. Alternative chroma sample relative locations may be indicated in video usability information. FIG. 3A illustrate example nominal vertical and horizontal locations of 4:2:0 luma and chroma samples in a picture.

When the value of chroma_format_idc is equal to 2, the chroma samples are co-sited with the corresponding luma samples and the nominal locations in a picture are illustrated in FIG. 3B which illustrates nominal vertical and horizontal locations of 4:2:2 luma and chroma samples in a picture.

When the value of chroma_format_idc is equal to 3, all array samples are co-sited for all cases of pictures and the nominal locations in a picture are shown are illustrated in FIG. 3C which illustrates nominal vertical and horizontal locations of 4:4:4 luma and chroma samples in a picture.

pic_width_in_luma_samples specifies the width of each decoded picture in units of luma samples. pic_width_in_luma_samples may not be equal to 0 and may be an integer multiple of MinCbSizeY.

pic_height_in_luma_samples specifies the height of each decoded picture in units of luma samples. pic_height_in_luma_samples may not be equal to 0 and may be an integer multiple of MinCbSizeY.

bit_depth_luma_minus8 specifies the bit depth of the samples of the luma array BitDepthY and the value of the luma quantization parameter range offset QpBdOffsetY as follows:

$$BitDepth_Y = 8 + bit\_depth\_luma\_minus8$$

$$QpBdOffset_Y = 6 * bit\_depth\_luma\_minus8$$

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | bit_depth_luma_minus8 may be in the range of 0 to 8, inclusive.

bit_depth_chroma_minus8 specifies the bit depth of the samples of the chroma arrays $BitDepth_C$ and the value of the chroma quantization parameter range offset $QpBdOffset_C$ as follows:

$BitDepth_C = 8 + bit\_depth\_chroma\_minus8$ $QpBdOffset_C = 6*bit\_depth\_chroma\_minus8$ bit_depth_chroma_minus8 may be in the range of 0 to 8, inclusive.

qtbtt_dual_tree_intra_flag equal to 1 specifies that for I slices, each CTU is split into coding units with 64×64 luma samples using an implicit quadtree split and that these coding units are the root of two separate coding_quadtree syntax structure for luma and chroma.

log2_ctu_size_minus2 plus 2 specifies the luma coding tree block size of each CTU. log2_ctu_size_minus2 equal to 0, 1, 2, etc. indicate that the width and height of the CTU is equal to $2^{(2+0)}$, $2^{(2+1)}$, $2^{(2+2)}$, etc., respectively, i.e., that the CTU size is equal to 4×4, 8×8, 16×16, etc., respectively.

log2_min_qt_size_intra_slices_minus2 plus 2 specifies the minimum luma size of a leaf block resulting from quadtree splitting of a CTU in slices with slice_type equal to 2 (I). The value of log2_min_qt_size_intra_slices_minus2 may be in the range of 0 to CtbLog2SizeY−2, inclusive.

log2_min_qt_size_inter_slices_minus2 plus 2 specifies the minimum luma size of a leaf block resulting from quadtree splitting of a CTU in slices with slice_type equal to 0 (B) or 1 (P). The value of log2_min_qt_size_inter_slices_minus2 may be in the range of 0 to CtbLog2SizeY−2, inclusive.

max_mtt_hierarchy_depth_inter_slices specifies the maximum hierarchy depth for coding units resulting from multi-type tree splitting of a quadtree leaf in slices with slice_type equal to 0 (B) or 1 (P). The value of max_mtt_hierarchy_depth_inter_slices may be in the range of 0 to CtbLog2SizeY−MinTbLog2SizeY, inclusive.

max_mtt_hierarchy_depth_intra_slices specifies the maximum hierarchy depth for coding units resulting from multi-type tree splitting of a quadtree leaf in slices with slice_type equal to 2 (I). The value of max_mtt_hierarchy_depth_intra_slices may be in the range of 0 to CtbLog2SizeY−MinTbLog2SizeY, inclusive.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled.

sps_mts_intra_enabled_flag equal to 1 specifies that cu_mts_flag may be present in the residual coding syntax for intra coding units. sps_mts_intra_enabled_flag equal to 0 specifies that cu_mts_flag is not present in the residual coding syntax for intra coding units. cu_mts_flag[x0][y0] equal to 1 specifies that multiple transform selection is applied to the residual samples of the associated luma transform block. cu_mts_flag[x0][y0] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture. When cu_mts_flag[x0][y0] is not present, it is inferred to be equal to 0 sps_mts_inter_enabled_flag specifies that cu_mts_flag may be present in the residual coding syntax for inter coding units. sps_mts_inter_enabled_flag equal to 0 specifies that cu_mts_flag is not present in the residual coding syntax for inter coding units.

In some embodiments, the syntax structure indicating one or more coding properties of the bitstream may be pre-defined or indicated to pertain to a CVSG or a bitstream. For example, even if the profile-level syntax structure or alike is contained in a sequence parameter set, it may be required that the content of the profile-level syntax structure or alike is identical in all active sequence parameter sets for a single CVSG or bitstream.

Another example of the syntax structure indicating one or more coding properties of the bitstream is provided below:

First Portion:

| profile_level( ) { | Descriptor |
|---|---|
| profile_idc | u(8) |
| level_idc | u(8) |
| for( j = 0; j < 64; j++ ) | |
| constraint_flag[ j ] | u(1) |
| constraint_param_bits | u(64) |
| } | |

Second Portion:

| profile_constraint_params( ) { | Descriptor |
|---|---|
| numBits − 0 | |
| if( ConstraintFlag[ 0 ] ) { | |
| constraint0_param0 | u(F00 ) |
| constraint0_param1 | u(F01) |
| // any pre-defined number of parameters equal to M | |
| numBits += F00 + F01 + . . . + F0M | |
| } | |
| if( ConstraintFlag[ 1 ] ) { | |
| . . . // similar as above for ConstraintFlag[ 0 ] | |
| } | |
| // similar if( ConstraintFlag[ n ] ) section for all values of n specified in this version of the specification | |
| reserved_1_N_bits // a string of 0 or more bits, each equal to 1 | f(64 −numBits ) |
| } | |

In the example illustrated, the first portion comprises a profile indicator (profile_idc), a level indicator (level_idc), and 64 constraint flags. The second portion comprises a 64-bit profile_constraint_param_bits. The number of the constraint flags and the length of the syntax elements are merely examples; other pre-defined lengths could likewise be used.

The syntax of constraint_param_bits is specified with the profile_constraint_params( ) syntax structure. In some embodiments related to VVC, it is a requirement for bitstream conformance that numBits is less than or equal to 64 (or, generally, the length of the profile_constraint_param_bits in bits).

The values Fxy are pre-defined constants for the length (in bits) to indicate the y-th syntax element conditioned by the x-th constraint flag. However, it needs to be understood that variable-length-coded syntax elements, such as ue(v), could be used for selected syntax elements.

ConstraintFlag[i] is a variable that is set equal to constraint_flag[i] when decoding the profile_level( ) syntax structure. Alternatively, constraint_flag[i] equal to 1 may indicate that the constraint is not in use. This could make it easier to avoid start code emulations. In this case, ConstraintFlag[i] is set equal to !constraint_flag[i], where ! stands for a Boolean logical "not" operator.

In some embodiments, the syntax structure indicating one or more coding properties of the bitstream is a profile-level syntax structure that may comprise information for sub-bitstreams that comprise a subset of the sub-layers. An example is provided below:

First Portion

| profile_level_entry( profileFlag, levelFlag, constraintsFlag, constraintParamsFlag ) { | Descriptor |
|---|---|
| if( profileFlag ) | |
|   profile_idc | u(8) |
| if( levelFlag ) | |
|   level_idc | u(8) |
| if( constraintsFlag ) | |
|   for( j = 0; j < 64; j++ ) | |
|     constraint_flag[ j ] | u(1) |
| if( constraintParamsFlag ) | |
|   constraint_param_bits | u(64) |
| } | |

Second Portion:

| profile_level( ) { | Descriptor |
|---|---|
| profile_level_entry(1,1,1,1) // for all sub-layers, i.e. entire bitstream | |
| p1_num_sub_layers_minus1 | u(3) |
| for( i = 0; i < p1_num_sub_layers_minus1; i++ ) { | |
|   profile_flag[ i ] | u(1) |
|   level_flag[ i ] | u(1) |
|   constraints_flag[ i ] | u(1) |
|   constraint_params flag[ i ] | u(1) |
| } | |
| while( !byte aligned( ) ) | |
|   reserved_one_1bit | u(1) |
| for( i = 0; i < p1_num_sub_layers_minus1; i++ ) | |
|   profile_level_entry( | |
|     profile_flag[ i ], level_flag[ i ], constraints_flag[ i ], constraint_params_flag[i] ) | |
| } | |

As illustrated in the example above, profileFlag, levelFlag, constraintsFlag, profile_flag, level_flag, constraints_flag, and constraint_params_flag are utilized to indicate which pieces of profile-level syntax are inferred and which are present for the sub-bitstreams. When not present, the information may be inferred to be equal to the respective information in the sub-bitstream that has one sub-layer more, e.g. the information for sub-bitstream comprising sub-layer 0 only may be indicated to be inferred to be equal the information for sub-layers 0 and 1. Alternatively, it may be inferred that the information is inferred from the sub-bitstream that has one sub-layer less, e.g. the information for sub-bitstream comprising sub-layers 0 and 1 may be indicated to be inferred to be equal the information for sub-layer 0 only.

In another example embodiment, in order to share the syntax structure indicating one or more coding properties of the bitstream among multiple sub-layers or multiple layers (in scalable video coding) or multiple output layer sets or alike (in scalable video coding), a multitude of them may be indicated in the same containing structure and indexed. A mapping of the indices to the entire non-scalable bitstream, sub-bitstreams containing certain sub-layers only, output layer set, and/or a layer may be provided e.g. in a video parameter set. Alternatively, a multitude of profile-level syntax structures may be indicated, each in a different containing syntax structure that also contains an identifier value. A mapping of the identifier values to the entire non-scalable bitstream, sub-bitstreams containing certain sub-layers only, output layer set, and/or a layer may be provided e.g. in a video parameter set.

In some embodiments, the first portion of the syntax structure indicating one or more coding properties of the bitstream comprises a set of parameter set extension flags. A parameter set extension flag, when set, specifies that the syntax structure that contains the profile-level syntax structure (e.g. a sequence parameter set) contains additional syntax elements that are specific to an extension. For example, a first version of a coding standard might not contain scalable or 3D extensions, which might be defined in a later version of the coding standard. An extension flag may be used for a scalable extension and/or for a 3D extension. An example is provided below:

First Portion:

| profile_level( ) { | Descriptor |
|---|---|
| profile_idc | u(8) |
| level_idc | u(8) |
| reserved_sps_extension_8bits | u(8) |

-continued

| profile_level( ) { | Descriptor |
|---|---|
| reserved_sps_constraint_56bits | u(56) |
| startBitPos = bitstream_pointer_pos( ) | |
| endBitPos = bitstream_pointer_pos( ) | |
| numStuffingBits = 176 − (endBitPos − startBitPos) | |
| for( i = 0; i < numStuffingBits; i++ ) | |
|   reserved_zero_bit | u(1) |
| } | |

Second Portion:

| seq_parameter_set_rbsp( ) { | Descriptor |
|---|---|
|   profile_level( ) | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   ... // other syntax elements specified in v1 of the standard | |
|   if( reserved_sps_extension_8bits ) | |
|     while( more_rbsp_data( ) ) | |
|       sps_extension_data_flag | u(1) |
|   rbsp_trailing_bits( ) | |
| } | |

The syntax function bitstream_pointer_pos( ) may be specified to return the bit position of the bitstream pointer. The bitstream pointer of the first bit of the bitstream, in decoding order, is equal to a pre-defined value, such as 0. The bitstream pointer position may be specified to apply after the start code emulation prevention bytes have been removed.

The syntax function more_rbsp_data( ) may be specified as follows:

If there is no more data in the raw byte sequence payload (RBSP), the return value of more_rbsp_data( ) is equal to FALSE.

Otherwise, the RBSP data are searched for the last (least significant, right-most) bit equal to 1 that is present in the RBSP. Given the position of this bit, which is the first bit (rbsp_stop_one_bit) of the rbsp_trailing_bits( ) syntax structure, the following applies:

If there is more data in an RBSP before the rbsp_trailing_bits( ) syntax structure, the return value of more_rbsp_data( ) is equal to TRUE.

Otherwise, the return value of more_rbsp_data( ) is equal to FALSE.

The method for enabling determination of whether there is more data in the RBSP ma be specified by a container format. E.g. ISO base media file format encapsulation of HEVC prefixes each NAL unit with its length field that can be used to determine the size of RBSP. When the byte stream format is in use whether there is more data in the RBSP can be determined based on whether a start code follows in the byte stream.

The syntax for rbsp_trailing_bits( ) may be specified as follows:

| rbsp_trailing_bits( ) { | Descriptor |
|---|---|
|   rbsp_stop_one_bit /* equal to 1 */ | f(1) |
|   while( !byte_aligned( ) ) | |
|     rbsp_alignment_zero_bit /* equal to 0 */ | f(1) |
| } | |

In the example above, in order to conform to v1 of the VVC coding standard, eight SPS extension bits are reserved. reserved_sps_extension_8bits may be required to be equal to 2 in bitstreams. While not shown in the syntax below, some of the constraint flags might be specified to conform to v1 of the VVC coding standard. The values of reserved_zero_bit may be required to be equal to 0. startBitPos includes a pointer bitstream_pointer_pos( ) to the position of a start bit and endBitPos includes a pointer to the position of a end bit. numStuffingBits is the number of bits between the start bit and the end bit.

In some embodiments, a multi-layer extension may be utilized in the syntax structure indicating one or more coding properties of the bitstream. An example is provided below:

First Portion

| profile_level( ) { | Descriptor |
|---|---|
|   profile_idc | u(8) |
|   level_idc | u(8) |
|   multilayer_extension_flag | u(1) |
|   reserved_sps_extension_7bits | u(7) |
|   reserved_sps_constraint_56bits | u(56) |
|   startBitPos = bitstream_pointer_pos( ) | |
|   if( multilayer_extension_flag ) { | |
|     multilayer_constraint_param_0 | u(F00) |
|     multilayer_constraint_param_1 | u(F01) |
|     ... | |
|   } | |
|   endBitPos = bitstream_pointer_pos( ) | |
|   numStuffingBits = 176 − (endBitPos − startBitPos) | |
|   for( i = 0; i < numStuffingBits; i++ ) | |
|     reserved_zero_bit | u(1) |
| } | |

Second Portion

| seq_parameter_set_rbsp( ) { | Descriptor |
|---|---|
|   profile_level( ) | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   ... // other syntax elements specified in v1 of the standard | |
|   if( multilayer_extension_flag ) { | |
|     multilayer_sps_param 0 | u(G00) |
|     multilayer_sps_param 1 | u(G01) |
|     ... | |
|   } | |
|   if( reserved_ sps_extension_8bits ) | |
|     while( more_rbsp_data( ) ) | |
|       sps_extension_data_flag | u(1) |
|   rbsp_trailing_bits( ) | |
| } | |

The multilayer_extension_flag indicates the whether or not multilayer extension is present. The values Fxy and Gxz are pre-defined constants for the length (in bits) to indicate, respectively, the y-th syntax element in the second portion and z-th syntax element in the SPS extension conditioned by the x-th extension flag. However, it needs to be understood that variable-length-coded syntax elements, such as ue(v), could be used for selected syntax elements. multilayer_constraint_param_y indicates a constraint related to the multilayer extension and the indicated profile and level. multilayer_sps_param_z indicates a value of a syntax element that is in use when the SPS is active.

In some example embodiments, the syntax structure indicating one or more coding properties of the bitstream (for example, a profile-level syntax structure) does not affect the decoding process, i.e., the syntax elements included indicate constraints only and do not indicate parameter values that would affect the decoding process. Such a design has the following benefits:

The semantics of certain constraint flags and the related conditional syntax in the second portion could be specified by an entity that is not specifying the coding standard itself. For example, 3GPP could specify certain constraint flags and the related conditional syntax in the second portion for H.266/VVC.

A decoder may omit constraint flags and the second portion, and only consider profile_idc and level_idc (or alike) for determining if it is capable of decoding the bitstream. Since constraint flags and the second portion occupy a pre-defined fixed number of bits, a decoder does not need to know the syntax. Hence, any constraint flags defined in the future (in later versions of the specification) and the respective future extensions of the second portion are backward compatible.

An external organization may specify which constraint flags are required to be set in its "sub-profile". A decoder specifically built for a sub-profile is capable of decoding the profile-level signaling of a bitstream conforming to that sub-profile, since parsing the second portion only requires parsing of the conditional subsections corresponding to the constraint flags of the sub-profile.

As discussed earlier, the profile-level structure may pertain to a bitstream or a CVSG. Thus, the constraints indicated in the profile-level structure may pertain to a longer scope than the other syntax elements of the containing sequence parameter set.

An example is provided below with reference to the sequence parameter set previously described:

| profile_level( ) { | Descriptor |
|---|---|
| profile_idc | u(8) |
| level_idc | u(8) |
| separate_colour_plane_allowed_flag | u(1) |
| bit_depth_unconstrained_flag | u(1) |
| reserved_one_62bits | u(62) |
| startBitPos = bitstream_pointer_pos( ) | |
| if( bit_depth_unconstrained_flag = = 0 ) { | |
|   bit_depth_luma_max_minus8 | ue(v) |
|   for( i = 0; i < bit_depth_luma_max_minus8; i++ ) | |
|     bit_depth_luma_idx_minus8_flag[ i ] | u(1) |
|   bit_depth_chroma_max_minus8 | ue(v) |
|   for( i = 0; i < bit_depth_chroma_max_minus8; i++ ) | |
|     bit_depth_chroma_idx_minus8_flag[ i ] | u(1) |
| } | |
| endBitPos = bitstream_pointer_pos( ) | |
| numStuffingBits = 176 − (endBitPos − startBitPos) | |
| for( i = 0; i < numStuffingBits; i++ ) | |
|   reserved_one_bit | u(1) |
| } | |

In the example illustrated above, the first portion comprises a profile indicator (profile_idc), a level indicator (level_idc), and 64 constraint flags. The second portion comprises 176 bits. The number of the constraint flags and the length of the syntax elements are merely examples; other pre-defined lengths could likewise be used. A constraint flag equal to 0 specifies that the respective constraint is in use. It should be understood that the example could have been similarly described with a constraint flag equal to 1 specifying that the respective constraint is in use. In this example, profile-level structure pertains to a bitstream, but the semantics could be similarly described for a profile-level structure applying to other scopes, such as CVSG or CYS. Indications related to separate colour planes and a constrained set of bit-depth values are illustrated. It needs to be understood that these indicates are merely examples and other embodiments could similarly be described with other indications. In this example, a profile (indicated by a particular value of profile_idc) allows the use of separate colour planes, and that external bodies may want to disallow separate colour planes in their sub-profiles. In this example, a profile (indicated by a particular value of profile_idc) allows the use of several bit-depth values (e.g. a 10-bit profile may allow the use of bit depths 8, 9, and 10 and the selection of bit depth separately for luma and chroma). It is further assumed that external bodies may want to limit the bit depths that are allowed (e.g. a 10-bit profile may be limited to a sub-profile allowing bit-depths 8 and 10 only).

separate_colour_plane_allowed_flag equal to 0 indicates that separate_colour_plane_flag is equal to 0 in the active SPSs for the bitstream. separate_colour_plane_allowed_flag equal to 1 indicates that separate_colour_plane_flag is equal to 0 or 1 in the active SPSs for the bitstream. When the profile indicated by profile_idc allows the use of separate colour plane, separate_colour_plane_allowed_flag equal to 0 may be used to indicate a constraint that separate colour planes are not in use in the bitstream.

bit_depth_unconstrained flag equal to 0 indicates that the used bit-depth values in the active SPSs for the bitstream are constrained as specified by bit_depth_luma_max_minus8, bit_depth_luma_idx_minus8_flag[i], bit_depth_chroma_max_minus8, and bit_depth_chroma_idx_minus8_flag[i]. bit_depth_unconstrained flag equal to 1 indicates that the bit-depth values in the active SPSs for the bitstream may or may not be constrained further relative to what is implied by the profile_idc value.

bit_depth_luma_max_minus8 plus 8 indicates the maximum bit depth that may be present among all the luma sample arrays of all the pictures of the bitstream. The value is required to obey the bit depth constraints implied by the profile_idc value.

bit_depth_luma_idx_minus8_flag[i] equal to 0 indicates that no luma sample array among all the pictures of the bitstream has bit depth equal to 8+i. bit_depth_luma_idx_minus8_flag[i] equal to 1 indicates that luma sample arrays among all the pictures of the bitstream may have bit depth equal to 8+i.

bit_depth_chroma_max_minus8 plus 8 indicates the maximum bit depth that may be present among all the chroma sample arrays of all the pictures of the bitstream. The value is required to obey the bit depth constraints implied by the profile_idc value.

bit_depth_chroma_idx_minus8_flag[i] equal to 0 indicates that no chroma sample array among all the pictures of the bitstream has bit depth equal to 8+i. bit_depth_chroma_idx_minus8_flag[i] equal to 1 indicates that chroma sample arrays among all the pictures of the bitstream may have bit depth equal to 8+i.

In some embodiments, the syntax structure indicating one or more coding properties of the bitstream (for example, a profile-level syntax structure) affects the decoding process, i.e. the syntax elements included in the profile-level syntax structure indicate may indicate parameter values that affect the decoding process. Such a design has the benefit of having a more compact syntax than in the case when the profile-level syntax structure contains only indications. An example is provided below:

| profile_level( ) { | Descriptor |
|---|---|
| profile_idc | u(8) |
| level_idc | u(8) |
| default_chroma_format_flag | u(1) |
| default_bit_depth_flag | u(1) |
| reserved_one_62bits | u(62) |
| startBitPos = bitstream_pointer_pos( ) | |
| if( default_chroma_format_flag = = 0 ) { | |
|    p1_chroma_format_idc | ue(v) |
|    if( p1_chroma_format_idc = = 2) | |
|      separate_colour_plane_flag | u(1) |
| } | |
| if( default_bit_depth_flag = = 0 ) { | |
|    bit_depth_luma_minus8 | ue(v) |
|    bit_depth_chroma_minus8 | ue(v) |
| } | |
| endBitPos = bitstream_pointer_pos( ) | |
| numStuffingBits = 176 − (endBitPos − startBitPos) | |
| for( i = 0; i < numStuffingBits; i++ ) | |
|    reserved_one_bit | u(1) |
| } | |

In the example illustrated above, the chroma format remains unchanged for the validity scope of the profile-level syntax structure (e.g. for the entire bitstream). In the example illustrated above, the luma and chroma bit depths remain unchanged for the validity scope of the profile-level syntax structure.

As previously described, default_chroma_format_flag equal to 1 specifies that the variable ChromaFormatIdc is set equal to 1. The semantics of ChromaFormatIdc are specified identically to those for chroma_format_idc as described earlier, default_chroma_format_flag equal to 0 specifies that pl_chroma_format_idc is present. default_bit_depth_flag equal to 1 specifies that bit_depth_luma_minus8 and bit_depth_chroma_minus8 are inferred to be equal to 0. default_bit_depth_flag specifies that bit_depth_luma_minus8 and bit_depth_chroma_minus8 are present. pl_chroma_format_idc is used to derive the value of ChromaFormatIdc as follows: If pl_chroma_format_idc is equal to 0, ChromaFormatIdc is set equal to 0. Otherwise, ChromaFormatIdc is set equal to pl_chroma_format_idc+1. The value of pl_chroma_format_idc is in the range of 0 to 2, inclusive.

Chroma format and bit-depth related syntax elements are included in the profile-level syntax structure and hence need not be present elsewhere in the sequence parameter set, as illustrated in the following example SPS syntax structure (similar to the SPS syntax structure previously provided):

| seq_parameter_set_rbsp( ) { | Descriptor |
|---|---|
| profile_level( ) | |
| sps_seq_parameter_set_id | ue(v) |
| pic_width_in_luma_samples | ue(v) |
| pic_height_in_luma_samples | ue(v) |
| qtbtt_dual_tree_intra_flag | ue(v) |
| log2_ctu_size_minus2 | ue(v) |
| log2_min_qt_size_infra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | u(1) |
| sps_mts_intra_enabled_flag | u(1) |
| sps_mts_inter_enabled_flag | u(1) |
| rbsp_trailing_bits( ) | |
| } | |

In an embodiment, the approach of not affecting decoding process may be combined with the approach of affecting the decoding process. For example, a profile-level syntax structure may include some syntax elements not affecting the decoding process and some other syntax elements affecting the decoding process. For example, syntax specified in version 1 of a standard may affect the decoding process, and syntax specified in the first version introducing an extension may affect the decoding of a bitstream conforming to that extension. Constraint flags or such specified in a later version may indicate constraints only and not affect the decoding process.

An example embodiment of a combination of the approach of not affecting decoding process may be combined with the approach of affecting decoding process is provided below.

| profile_level( ) { | Descriptor |
|---|---|
| profile_idc | u(8) |
| level_idc | u(8) |
| reserved_zero_constraint_32bits | u(32) |
| bit_depth_flag | u(1) |
| chroma_format_flag | u(1) |
| reserved_zero_dec_30bits | u(30) |
| startBitPos = bitstream_pointer_pos( ) | |
| if( bit_depth_flag ) { | |
|    luma_bit_depth_minus8 | u(4) |
|    chroma_bit_depth_minus8 | u(4) |
| } | |
| if( chroma_format_flag ) | |
|    p1_chroma_format_idc | u(2) |
| endBitPos = bitstream_pointer_pos( ) | |
| numStuffingBits = 128 − (endBitPos − startBitPos) | |
| for( i = 0; i < numStuffingBits; i++ ) | |
|    reserved_zero_bit | u(1) |
| } | |

The profile_level( ) syntax structure contains the following parts: 1) Profile indicator (profile_idc). 8-bit fixed length code is suggested as an example but other possibilities could be likewise used. 2) Level indicator (level_idc). 8-bit fixed length code is suggested as an example but other possibilities could be likewise used. 3) A fixed number of flags for indicating constraints. 32 reserved flags are suggested as an example but other possibilities could be likewise used. These flags do not have an impact on the decoding process. 4) A fixed number of flags for indicating extensions or otherwise affecting the decoding process. Flags for bit depth and chroma format are proposed. In addition, 30 reserved flags are presented as an example but other number of reserved flags could be likewise used. 5) A pre-defined number of bits for syntax elements, which could be important as interoperability point indications. 128 bits are suggested as an example but other possibilities could be likewise used. Bit depth, chroma format, and separate colour plane indications are proposed to be included and coded as fixed-length code words (but variable length coding could likewise be used). The bit depth and chroma format syntax elements are proposed to affect normative decoder operation, i.e., they are not repeated elsewhere in the sequence parameter set.

The semantics of syntax elements of profile_level( ) may be specified as follows: bit_depth_flag equal to 0 specifies that luma_bit_depth_minus8 and chroma_bit_depth_minus8 are inferred to be equal to 0. bit_depth_flag equal to 1 specifies that luma_bit_depth_minus8 and chroma_bit_depth_minus8 are present. chroma_format_flag equal to 0 specifies that ChromaFormatIdc is equal to 1 and SeparateColourPlaneFlag is equal to 0. chroma_format_flag equal to 1 specifies that pl_chroma_format_idc is present. pl_chroma_format_idc specifies the chroma sampling relative to the luma sampling and whether the three colour components of the 4:4:4 chroma format are coded separately, as specified below.

| pl_chroma_format_idc | ChromaFormatIdc | SeparateColourPlaneFlag | Chroma format |
|---|---|---|---|
| 0 | 0 | 0 | Monochrome |
| not present | 1 | 0 | 4:2:0 |
| 1 | 2 | 0 | 4:2:2 |
| 2 | 3 | 0 | 4:4:4 |
| 3 | 3 | 1 | 4:4:4 |

The following syntax illustrates with one constraint flag and one additional extension flag how the profile_level( ) structure can be extended beyond what was presented above.

| profile_level( ) { | Descriptor |
|---|---|
| profile_idc | u(8) |
| level_idc | u(8) |
| constraint_0_flag | u(1) |
| reserved_zero_constraint_31bits | u(31) |
| bit_depth_flag | u(1) |
| chroma_format_flag | u(1) |
| dec_param_0_flag | u(1) |
| reserved_zero_dec_29bits | u(29) |
| startBitPos = bitstream_pointer_pos( ) | |
| if( bit_depth_flag ) { | |
|   luma_bit_depth_minus8 | u(4) |
|   chroma_bit_depth_minus8 | u(4) |
| } | |
| if( chroma_format_flag ) | |
|   p1_chroma_format_idc | u(2) |
| if( dec_param_0_flag ) { | |
|   // any extension-specific syntax elements | |
| } | |
| /* similar if clause for all specified extension flags with additional syntax elements would be added here */ | |
| if( constraint_0_flag ) { | |
|   // any syntax elements giving properties for the constraint | |
| } | |
| /* similar if clause for all specified constraint flags with additional syntax elements would be added here */ | |
| numStuffingBits = 128 − (endBitPos − startBitPos) | |
| for( i = 0; i < numStuffingBits; i++ ) | |
|   reserved_zero_bit | u(1) |
| } | |

In an embodiment, the second portion of the syntax structure indicating one or more coding properties of the bitstream (for example, a profile-level syntax structure) comprises syntax elements that are unconditionally present in addition to or instead of syntax elements whose presence is conditioned based on one ore more values of the syntax elements in the first portion of the profile-level syntax structure. An example embodiment is provided below, where chroma_format_idc, bit_depth_luma_minus8, and bit_depth_chroma_minus8 are unconditionally present in the second portion of the profile-level syntax structure.

| profile_level( ) { | Descriptor |
|---|---|
| profile_idc | u(8) |
| level_idc | u(8) |
| reserved_zero_64bits /* e.g. constraint or extension flags */ | u(64) |
| startBitPos = bitstream_pointer_pos( ) | |
| chroma_format_idc | ue(v) |
| if( chroma_format_idc = = 2) | |
|   separate_colour_plane_flag | u(1) |
| bit_depth_luma_minus8 | ue(v) |
| bit_depth_chroma_minus8 | ue(v) |
| /* In later drafts of VVC v1, other syntax elements that are present in VVC v1 can be added here. */ | |
| /* In later VVC v1 drafts or later versions VVC, other syntax elements that are present as conditioned by constraint or extension flags can be added here. */ | |
| endBitPos = bitstream_pointer_pos( ) | |
| numStuffingBits = 176 − (endBitPos − startBitPos) | |
| for( i = 0; i < numStuffingBits; i++ ) | |
|   reserved_one_bit | u(1) |
| } | |

In some embodiments, constraints and/or syntax elements in the first and/or second portion constraints and/or syntax elements in the first and/or second portion of the syntax structure indicating one or more coding properties of the bitstream may include one or more of the following:

Progressive source content indication

Interlaced source content indication

Indication that there are coded frames only

Indication that there are coded fields only

Indication of spatially and/or temporally packed video content that may require unpacking before displaying Indication of projected video content, such as omnidirectional projection (e.g. equirectangular projection), that may require processing, such as selection of a viewport and resampling for the selected viewport, before displaying Bit depth for luma and/or chroma (that is used in all pictures), and/or minimum bit depth for luma, and/or chroma, and/or maximum bit depth for luma and/or chroma Chroma format and/or indication of monochrome content Picture types and/or slice types (e.g. I slice, P slice, B slice) and/or alike that are in use Prediction types (e.g. intra prediction, inter prediction) that are in use Indication that the bitstream consists of one access unit or coded picture only Bitrate, according to a buffering model, which can be used in inputting to a (hypothetical) decoder Indication of an independent non-base layer The number of temporal sub-layers, or the greatest temporal identifier value (e.g. TemporalId in HEVC), that is or may be present The layers that are or may be present Indication that temporal sub-layers are nested, i.e. that each picture with TemporalId equal to tId that is greater than 0 can be decoded if the preceding pictures, in decoding order, with TemporalId less than tId have been decoded Picture width and height (that is used in all pictures), and/or minimum picture width and height, and/or maximum picture width and height A number of reference pictures and/or a number of pictures (or picture storage slots) in a decoded picture buffer required for decoding A maximum number of pictures required to be decoded prior to decoding any given picture A maximum number of output pictures that can precede any output picture in decoding order and follow that picture in output order A maximum number of output pictures that can precede any output picture in output order and follow that picture with in decoding order A minimum coding block size, such as a minimum luma coding block size A maximum coding block size, such as a maximum luma coding block size A minimum coding tree unit size, such as a minimum luma coding tree block size A maximum coding tree unit size, such as a maximum luma coding tree block size A maximum partitioning depth for coding tree blocks A finest motion vector resolution that may be required for decoding A coarsest motion vector resolution that may be required for decoding Turning coding tools on or off. Such coding tools may comprise but are not limited to filtering (e.g. deblocking, sample adaptive offset, and/or adaptive loop filtering), intra prediction modes, inter prediction modes (e.g. weighted prediction), motion vector prediction modes (e.g. temporal motion vector prediction), residual coding modes (e.g. cross-component prediction). The first portion may indicate if constraints are applied for a group of coding tools (e.g. intra prediction). If so, the second portion may comprise syntax elements for indicating which constraints have been applied (e.g. which intra prediction modes are not in use).

A number of long-term reference pictures that are or may be used, or an indication if long-term reference pictures that are or may be used.

Information on picture partitioning that is or may be used. Such information may for example be but is not limited one or more of the following. It needs to be understood that while the bullets refer to tiles, the bullets could similarly refer to other spatial units (e.g. slices, subpictures)

indication if constant size of tiles are used minimum tile size and/or maximum tile size in use indication if tiles are motion-constrained, or sets of tiles that are motion-constrained tile sets In some embodiments, the first portion may indicate whether block partitioning constraints are in use. If so, the second portion may comprise a group of block partitioning constraint indications, including e.g. if binary block splitting is disabled, if ternary block splitting is disabled, if quaternary block splitting is disabled, if chroma blocks are disabled to have different block splitting than the corresponding luma blocks.

Constraints on Hypothetical Reference Decoder (HRD) parameters or Video Buffering Verifier (VBV) parameters or alike.

In the list above, some properties are indicated as positive statements (certain property is or may be used in coded pictures). It needs to be understood that alternatively or additionally properties could be similarly indicated as statements which properties do not appear in coded pictures. Likewise, in the list above, some properties are indicated as negative statements (certain property is not used or is disabled in coded pictures). It needs to be understood that alternatively or additionally properties could be similarly indicated as positive statements (which properties may appear in coded pictures).

A certain profile indicator value may be defined to imply a defined set of constraints. A first profile may be defined to use that profile indicator value and a set of additional constraints or extensions in the first portion and/or the second portion. A second profile may be defined to use that same profile indicator value and a different set of additional constraints or extensions in the first portion and/or the second portion.

Certain embodiments have been described with reference to the second portion having a pre-defined length in bits. It needs to be understood that embodiments can be applied similarly when the second portion has a variable length in bits. For example, the length of the second portion may be such that the second portion only comprises the syntax elements that are determined to be present as conditioned by the syntax element values of the first portion. In this case, there may be no stuffing bits or alike in the second portion. In another example, the length of the second portion may be varying but needs to be a multiple of certain granularity, such as 8 bits (for reaching byte alignment), 24 bits (for unambiguous mapping to base64 encoding), or 32 bits (for reaching double-word alignment). In this case, the second portion comprises the syntax elements that are determined to be present as conditioned by the syntax element values of the first portion and stuffing bits to reach a desired alignment. A benefit of a varying length second portion is the bit count saving, since no or fewer stuffing bits are included in the profile_level( ) syntax structure or alike. Potential disadvantages of a varying length second portion are that the structure may have to be framed (e.g. by length-prefixing) in communication protocols, and that dynamic memory allocation would be needed to take advantage of the bit count saving.

An example embodiment with a varying length second portion is described with the following syntax structure:

| profile_level( ) { | Descriptor |
|---|---|
| profile_idc | u(5) |
| reserved_zero_3bits | u(3) |
| num_24bit_extensions | u(4) |
| reserved_zero_4bits | u(4) |
| level_idc | u(8) |
| reserved_zero_constraint_48bits | u(48) |
| bit_depth_flag | u(1) |
| chroma_format_flag | u(1) |
| reserved_zero_dec_46bits | u(46) |
| startBitPos = bitstream_pointer_pos( ) | |
| if( bit_depth_flag ) { | |
|    luma_bit_depth_minus8 | u(4) |
|    chroma_bit_depth_minus8 | u(4) |
| } | |
| if( chroma_format_flag ) | |
|    p1_chroma_format_idc | u(2) |
| endBitPos = bitstream_pointer_pos( ) | |
| numStuffingBits = num_24bit_extensions * 24 − (endBitPos − startBitPos) | |
| for( i = 0; i < numStuffingBits; i++ ) | |
|    reserved_zero_bit | u(1) |
| } | | num_24bit_extensions*24+120 specifies the number of bits in the profile_level( ) syntax structure. The semantics of other syntax elements may be specified similarly to the semantics of the same or similar syntax elements in other embodiments. In this example embodiment the number of bits in the first portion is 120, and the number of bits in the second portion is num_24bit_extensions*24. By keeping the structures are syntax elements aligned with an integer multiple of 24 bits, both byte alignment and base64 encoding of the structure can be achieved without specifying handling of the end of the structure outside the codec. profile_idc, num_24bit_extensions, and level_idc appear in different characters in a base64 encoding of the structure and can therefore be easily parsed. It may be required that the encoder ensures bitstream conformance by selecting the value of num_24bit_extensions so that numStuffingBits is greater than or equal to 0.

As shown in block 24, the apparatus includes means, such as the processing circuitry 12, the memory 14 or the like, for causing storage of the bitstream (for example, along with the syntax structure encoded).

Referring now to FIG. 4, the operations performed, such as by the apparatus 10 of FIG. 1, in order to decode a bitstream that includes a syntax structure that include non-binary profile constraints in image or video bitstreams such that a decoder may be able to determine whether the decoder is capable of decoding the bitstream without completely decoding the bitstream, is illustrated.

As shown in block 40, the apparatus includes means, such as the processing circuitry 12, the communication interface 16 or the like, for receiving a bitstream. The bitstream may be a video or a image bitstream and the bitstream may be received as part of other bitstreams, such as other bitstreams in the same elementary stream and bitstreams from other elementary streams. In some embodiments, the bitstream may be a bitstream defined under VVC or a bitstream defined under HEVC.

As shown in block 42, the apparatus includes means, such as the processing circuitry 12 or the like, for decoding, by using a decoder, one or more coding properties of the bitstream from a syntax structure associated with the bitstream. In some embodiments, the syntax structure include a first portion comprising one or more fixed syntax elements with one or more pre-defined lengths in bits at one or more pre-defined bit positions, and a second portion comprising one or more conditional syntax elements. In some embodiment, presence of the one or more conditional syntax elements is conditioned based on one or more values associated with the one or more fixed elements. In some embodiments, each of the one or more conditional syntax elements has one or more pre-defined lengths in bits. In some embodiments, the second portion has a pre-defined length in bits. In some embodiments, the syntax structure is the same structure described in conjunction with FIG. 2.

As shown in block 44, the apparatus includes means, such as the processing circuitry 12 or the like, for determining whether the decoder is capable of decoding the bitstream based on the one or more coding properties.

Upon determining that the decoder is capable of decoding the bitstream, as shown in block 46, the apparatus includes means, such as the processing circuitry 12 or the like, for decoding one or more video or pictures within the bitstream.

As described above, FIGS. 2 and 4 are flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 2 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
encoding one or more source pictures into a bitstream, the encoding comprising one or more coding properties; and encoding a syntax structure indicating the one or more coding properties of the bitstream into or along the bitstream, wherein the syntax structure comprises: a first portion comprising one or more fixed syntax elements with one or more pre- defined lengths in bits at one or more pre-defined bit positions; and a second portion comprising one or more conditional syntax elements, wherein presence of the one or more conditional syntax elements is conditioned based on one or more values associated with the one or more fixed syntax elements; wherein the second portion comprises a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream.

2. The method according to claim 1 wherein the syntax structure is readable by a decoder without decoding one or more pictures from the bitstream.

3. An apparatus comprising at least one processor and at least one non-transitory memory including computer program code for one or more programs, the at least one memory and the computer program code configured to, with the at least one processor, cause the apparatus at least to:
encode one or more source pictures into a bitstream, the encoding comprising one or more coding properties; and encode a syntax structure indicating the one or more coding properties of the bitstream into or along the bitstream, wherein the syntax structure comprises: a first portion comprising one or more fixed syntax elements with one or more pre-defined lengths in bits at one or more pre-defined bit positions, and a second portion further comprising one or more conditional syntax elements, wherein presence of the one or more conditional syntax elements is conditioned based on one or more values associated with the one or more fixed syntax elements; wherein the second portion comprises a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream.

4. The apparatus according to claim 3 wherein the syntax structure is readable by a decoder without decoding one or more pictures from the bitstream.

5. The apparatus according to claim 3 wherein the first portion further comprises a profile indicator, and one or more of: one or more constraint flags or one or more extension flags, wherein the profile indicator indicates a set of algorithmic features or one or more syntax constraints to which the bitstream conforms, wherein the one or more constraint flags indicates further constraints on one or more algorithmic features or one or more syntax constraints to which the bitstream conforms, and wherein the one or more extension flags affect decoding of the bitstream.

6. A non-transitory computer-readable storage medium having computer executable program code instructions stored therein, the computer executable program code instructions comprising program code instructions configured, upon execution, to cause an apparatus to: encode one or more source pictures into a bitstream, the encoding comprising one or more coding properties; and encode a syntax structure indicating the one or more coding properties of the bitstream into or along the bitstream, wherein the syntax structure comprises:
a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed syntax elements; wherein the second portion has a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream.

7. A method comprising:
receiving a bitstream; decoding one or more coding properties of the bitstream from a syntax structure associated with the bitstream, wherein the syntax structure comprises: a first portion comprising one or more fixed syntax elements with one or more pre-defined lengths in bits at one or more pre-defined bit positions; and a second portion comprising one or more conditional syntax elements, wherein presence of the one or more conditional syntax elements is conditioned based on one or more values associated with the one or more fixed syntax elements; and determining whether a decoder is capable of decoding the bitstream based on the one or more coding properties; wherein the second portion comprises a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream.

8. An apparatus comprising at least one processor and at least one non transitory memory including computer program code for one or more programs, the at least one memory and the computer program code configured to, with the at least one processor, cause the apparatus at least to:
receive a bitstream; decode one or more coding properties of the bitstream from a syntax structure associated with the bitstream, wherein the syntax structure comprises:
a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed syntax elements; wherein the second portion comprises a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream; and determine whether a decoder is capable of decoding the bitstream based on the one or more coding properties.

9. The apparatus according to claim 8 wherein the syntax structure is readable by the decoder without decoding one or more pictures from the bitstream.

10. The apparatus according to claim 8 wherein the first portion further comprises a profile indicator, and one or more of: one or more constraint flags or one or more extension flags, wherein the profile indicator indicates a set of algorithmic features or one or more syntax constraints to which the bitstream conforms, wherein the one or more constraint flags indicates further constraints on one or more algorithmic features or one or more syntax constraints to which the bitstream conforms, and wherein the one or more extension flags affect decoding of the bitstream.

11. A non-transitory computer-readable storage medium having computer executable program code instructions stored therein, the computer executable program code instructions comprising program code instructions configured, upon execution, to cause the apparatus to: receive a bitstream; decode one or more coding properties of the bitstream from a syntax structure associated with the bitstream, wherein the syntax structure comprises:

a first portion comprising one or more fixed syntax elements with one or more pre-defined lengths in bits at one or more pre-defined bit positions, and a second portion comprising one or more conditional syntax elements, wherein presence of the one or more conditional syntax elements is conditioned based on one or more values associated with the one or more fixed syntax elements; wherein the second portion comprises a pre-defined length in bits, the pre-defined length in bits of the second portion being a fixed length or a variable length, and the pre-defined length in bits of the second portion is given with at least one programmatic structure within the second portion, the programmatic structure comprising at least one statement that defines the length of the second portion; wherein the second portion further comprises one or more of: a maximum bit depth for one or more luma sample arrays in the bitstream, a maximum bit depth for one or more chroma sample arrays in the bitstream, or one or more other coding property indications associated with the bitstream; wherein the one or more other coding property indications associated with the bitstream comprises one or more of: a progressive source content indication associated with the bitstream, an interlaced source content indication associated with the bitstream, one or more picture type indications associated with one or more pictures of the bitstream, one or more prediction types associated with the bitstream, a bitrate associated with the bitstream, or an indication of an independent non-base layer associated with the bitstream; and determine whether a decoder is capable of decoding the bitstream based on the one or more coding properties.

12. The non-transitory computer-readable storage medium according to claim 11 wherein the syntax structure is readable by the decoder without decoding one or more pictures from the bitstream.

13. The non-transitory computer-readable storage medium according to claim 11 wherein the first portion further comprises a profile indicator, and one or more of: one or more constraint flags or one or more extension flags, wherein the profile indicator indicates a set of algorithmic features or one or more syntax constraints to which the bitstream conforms, wherein the one or more constraint flags indicates further constraints on one or more algorithmic features or one or more syntax constraints to which the bitstream conforms, and wherein the one or more extension flags affect decoding of the bitstream.

14. The method of claim 1, wherein the first portion or second portion further comprises at least one extension flag or at least one compatibility flag, wherein the at least one extension flag or the at least one compatibility flag affects decoding of the bitstream.

15. The method of claim 14, wherein the at least one extension flag specifies that a containing syntax structure that comprises the syntax structure includes at least one syntax element specific to an extension.

16. The method of claim 14, wherein the at least one compatibility flag indicates that a coded video sequence conforms to more than one profile.

17. The method of claim 14, wherein the containing syntax structure comprises a sequence parameter set.

18. The method of claim 14, wherein the at least one extension flag or compatibility flag enables forward compatibility so that an encoder or decoder processes inputs from a later version of the encoder or decoder, or backward compatibility so that the encoder or decoder processes inputs from an earlier version of the encoder or decoder.

* * * * *